United States Patent
Slavin

(10) Patent No.: US 12,008,654 B2
(45) Date of Patent: *Jun. 11, 2024

(54) AUTOMATIC ACTION-BASED PRODUCT PROVISIONING

(71) Applicant: Sure, Inc., San Diego, CA (US)

(72) Inventor: Wayne Slavin, Santa Monica, CA (US)

(73) Assignee: Sure, Inc., San Diego, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/827,315

(22) Filed: May 27, 2022

(65) Prior Publication Data

US 2022/0292610 A1 Sep. 15, 2022

Related U.S. Application Data

(63) Continuation of application No. 16/900,725, filed on Jun. 12, 2020, now Pat. No. 11,386,502.

(Continued)

(51) Int. Cl.
*G06Q 40/08* (2012.01)
*G06Q 10/0631* (2023.01)
(Continued)

(52) U.S. Cl.
CPC ....... *G06Q 40/08* (2013.01); *G06Q 10/06315* (2013.01); *G06Q 10/10* (2013.01);
(Continued)

(58) Field of Classification Search
CPC .. G06Q 40/08; G06Q 10/06315; G06Q 10/10; G06Q 20/085; G06Q 20/108;
(Continued)

(56) References Cited

U.S. PATENT DOCUMENTS 9,390,452 B1 * 7/2016 Biemer .............. G01C 21/3469
10,445,758 B1 * 10/2019 Bryer .................... G06Q 40/08
(Continued)

OTHER PUBLICATIONS

"EIS introduces usage-based insurance solution that unifies personal and commercial car use for continuous coverage: includes ridesharing solution enabling insurers to cover drivers based on How far, How Well, When and Now—Why They Drive", PR NewsWire, ProQuest ID 2465704299, New York Dec. 1, 2020.*

(Continued)

*Primary Examiner* — Frantzy Poinvil

(74) *Attorney, Agent, or Firm* — Fenwick & West LLP

(57) ABSTRACT

A mobile device initiates automatic action-based product provisioning for rides. The mobile device detects a ride protection trigger and alerts a management server of the detected ride protection trigger. The mobile device also retrieves ride information from a ride application and sends the ride information to the management server. The management server determines a ride action based on the ride protection trigger and the ride information. The management server identifies a product based on the determined ride action and sends the ride information and a request for a dynamic product to a product provisioning server. The product provisioning server generates the dynamic product based on the request and the ride information and sends the generated dynamic product to the management server. The management server may send the dynamic product to the mobile device for display.

20 Claims, 4 Drawing Sheets

Related U.S. Application Data

(60) Provisional application No. 62/861,301, filed on Jun. 13, 2019.

(51) Int. Cl.
*G06Q 10/10* (2023.01)
*G06Q 20/08* (2012.01)
*G06Q 20/10* (2012.01)
*G06Q 50/40* (2024.01)
*G01S 19/42* (2010.01)

(52) U.S. Cl.
CPC ......... *G06Q 20/085* (2013.01); *G06Q 20/108* (2013.01); *G06Q 50/40* (2024.01); *G01S 19/42* (2013.01)

(58) Field of Classification Search
CPC .. G06Q 50/30; G06Q 20/322; G06Q 20/3224; G06Q 20/326; G01S 19/42
USPC ....................................................... 705/3–44
See application file for complete search history.

(56) References Cited

U.S. PATENT DOCUMENTS

| | | | |
|---|---|---|---|
| 10,805,659 | B2 | 10/2020 | Wasserman |
| 10,817,950 | B1 * | 10/2020 | Iqbal ...................... G07C 5/008 |
| 10,853,881 | B1 | 12/2020 | LaBarre et al. |
| 10,885,539 | B1 * | 1/2021 | Purgatorio ............ B60W 40/09 |
| 10,948,927 | B1 | 3/2021 | Harris et al. |
| 10,956,982 | B1 * | 3/2021 | Hayward ............... G07C 5/008 |
| 11,030,699 | B1 | 6/2021 | Floyd |
| 11,334,951 | B1 * | 5/2022 | Kolls ................... G05D 1/0088 |
| 2003/0233261 | A1 | 12/2003 | Kawahara et al. |
| 2010/0131305 | A1 | 5/2010 | Collopy et al. |
| 2011/0125536 | A1 | 5/2011 | Reynolds et al. |
| 2014/0019170 | A1 | 1/2014 | Coleman et al. |
| 2014/0046701 | A1 * | 2/2014 | Steinberg .............. B60W 40/10 705/4 |
| 2014/0114689 | A1 | 4/2014 | Davis et al. |
| 2016/0379310 | A1 | 12/2016 | Madigan et al. |
| 2018/0075380 | A1 * | 3/2018 | Perl ........................ G06Q 40/08 |
| 2019/0073695 | A1 | 3/2019 | Wasserman et al. |
| 2019/0311404 | A1 | 10/2019 | Wasserman et al. |
| 2020/0357075 | A1 * | 11/2020 | Dahl .................... G07C 5/0816 |
| 2023/0134342 | A1 * | 5/2023 | Chandra .................. G06N 5/04 705/4 |

OTHER PUBLICATIONS

Postmedia Network Inc., "Insurance changes for ride-hailing in B.C. approved," The Vancouver Sun, Aug. 9, 2019, 2 pages.

United States Office Action, U.S. Appl. No. 16/900,725, filed Aug. 2, 2021, 11 pages.

* cited by examiner

AUTOMATIC ACTION-BASED PRODUCT PROVISIONING

CROSS-REFERENCE TO RELATED APPLICATIONS

This application is a continuation of U.S. patent application Ser. No. 16/900,725, filed Jun. 12, 2020, which claims the benefit of U.S. Patent Application No. 62/861,301, filed Jun. 13, 2019, both of which are incorporated by reference herein.

TECHNICAL FIELD

The disclosure relates generally to ride sharing and in particular to automatic action-based product provisioning for rides using mobile devices.

BACKGROUND

Users of mobile devices travel by taking rides in vehicles. Ride sharing is an emergent field where a user of a mobile device uses an application on the mobile device to request a ride to a destination. Drivers of vehicles (e.g., drivers of cars) receive ride requests and can choose to provide the ride to the user, often in exchange for some form of compensation. Typical vehicle insurance (e.g., car insurance) does not necessarily cover medical bills from accidents the user experiences while ride sharing. Purchasing insurance policies each time the user requests a ride is time consuming and inefficient.

SUMMARY

A coordination module on a mobile device connects to a ride application on the mobile device. The coordination module receives user input from a user of the mobile device to apply for a product using the coordination module, such as ride insurance that insures a rider for the duration of a ride. The coordination module sends the application for the product, as well as additional information about the user, to a product provisioning server via a network. The product provisioning server generates a product based on the application and the additional information and sends the generated product to the coordination module via the network. The mobile device presents the generated product to the user and receives user acceptance of the generated product. The mobile device initiates a ride protection trigger based on the generated product that is hooked to the ride application. The coordination module sends the generated product and ride protection trigger to a management server that manages use of the product based on activation of the ride protection trigger.

The coordination module detects an activation of the ride protection trigger and alerts the management server of the activated ride protection trigger. The coordination module also retrieves ride information from the ride application and sends the ride information to the management server. The management server determines a ride action based on the ride protection trigger and the ride information, such as a ride share vehicle reaching a pickup point. The management server identifies a corresponding product based on the determined ride action and sends the ride information and a request for a dynamic product based on the identified product, such as an instance of a ride insurance policy, to the product provisioning server. The product provisioning server generates the dynamic product based on the request and the ride information and sends the generated dynamic product to the management server. The management server automatically acquires the dynamic policy, which has a cost based on the ride information.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DESCRIPTION

Figure 1:
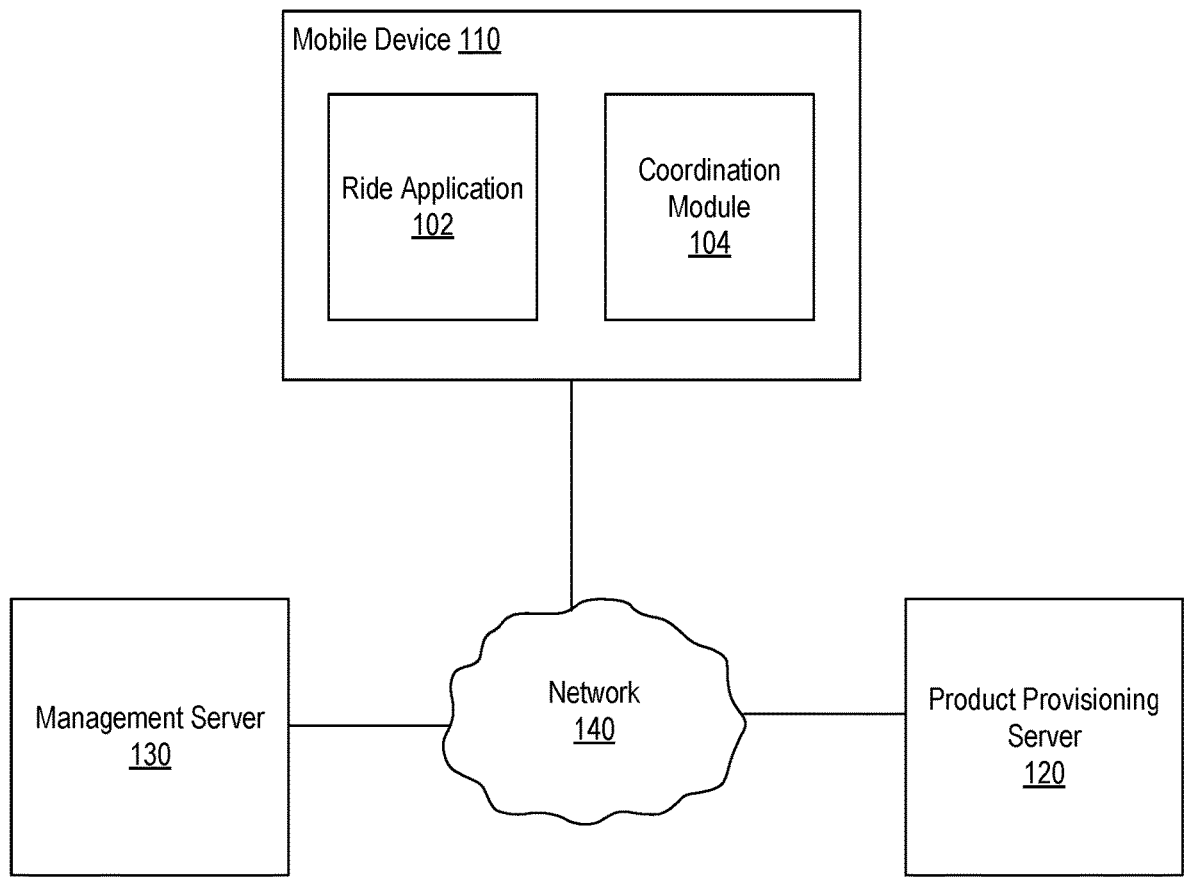
FIG. 1 illustrates a system for automatic action-based product provisioning, according to one embodiment.

FIG. 1 illustrates a system for automatic action-based product provisioning, according to one embodiment. FIG. 1 includes a mobile device 110, a product provisioning server (PPS) 120, and a management server 130 connected by a network 140. The mobile device 110 includes a ride application 102 and a coordination module 104. Automatic action-based product provisioning involves the coordination module 104 hooking the ride application 102 to monitor ride actions, such as orders for rides, using ride protection triggers. When a ride protection trigger is activated, the coordination module 104 sends corresponding ride information to the management server 130. The management server 130 coordinates with the PPS 120 to automatically acquire a dynamic product for the ride based on analysis of the corresponding ride information, such that a dynamic product is generated for the ride without user input. The dynamic product may be a dynamically priced ride insurance policy that insures the rider for the duration of the ride and has a cost based on the ride information, such as a type of vehicle and an expected route.

The PPS 120 is a server configured to provide one or more products over the network 140. For example, the PPS 120 may be a server of an insurance provider, and the products may be insurance policies. In particular, the PPS 120 may provide ride insurance that insures a rider for a particular ride in a vehicle. In one embodiment, the ride insurance has a preset cost per ride regardless of details of each ride. Alternatively, in another embodiment, the price of the ride insurance varies depending upon the ride information for the ride. For example, the PPS 120 may determine a price for an instance of ride insurance based on corresponding ride information received from the coordination module 104, such as an expected duration of the ride, a make and model of the vehicle, a mileage of the vehicle, a location of the vehicle, an expected path of the ride, a pickup location for the ride, an expected average speed for the ride, personal information of the driver, a driver history of the driver, personal information of the user, rider history of the user, stored information about past drives and past rides of other drivers and riders, and past ride insurance prices of other riders. The PPS 120 may also factor for other actuarial data, e.g., actuarial data stored at the PPS 120. As a specific example, the PPS 120 may determine that ride insurance for a 100 mile ride over a mountain with poor roads at night during a thunderstorm in a 30-year-old car has a first price, while ride insurance for a 1 mile ride over dry flat ground with excellent roads during a clear day in a brand-new car has a lower price than the first price.

In an embodiment, the product is time-based ride insurance, where the PPS 120 provides ride insurance for a particular amount of time, such as 24 hours from purchase, and the ride insurance covers all rides the user takes during that time. The PPS 120 may price the time-based ride insurance dynamically based on received and/or stored data similar to the above-described ride insurance.

The PPS 120 receives applications to enroll with a product and accepts or rejects the applications. Acceptance or rejection of an application may be based on input to the PPS 120 by an administrator of the PPS 120. The PPS 120 receives ride information from the management server 130 and generates dynamic products based on the ride information, e.g., ride insurance with a particular dynamic price determined based on the ride information. The PPS 120 sends dynamic products to the management server 130 and/or mobile device 110. The PPS 120 receives payment from the management server 130 or mobile device 110 for the dynamic products.

In an embodiment, the PPS 120 receives product claims from the management server 130 and/or mobile device 110, e.g., an insurance claim for a ride insurance policy. The PPS 120 can request and/or receive information pertaining to the insurance claim from the management server 130 and/or mobile device 110, such as global positioning system (GPS) coordinates at one or more timestamps for the mobile device, GPS coordinates at one or more timestamps for the vehicle and/or driver, and so on. An administrator of the PPS 120 may review the information pertaining to the insurance claim and input to the PPS 120 instructions to accept or reject the insurance claim. In an embodiment, the PPS 120 automatedly accepts or rejects the insurance claim based on the information pertaining to the insurance claim. The PPS 120 sends a response to the mobile device 110 and/or management server 130 based on either acceptance or rejection of the insurance claim, which may include a payout amount.

The mobile device 110 may be a smartphone, tablet, personal computer, or other mobile computing device. The ride application 102 is used by a user of the mobile device to request rides to take the user of the mobile device 110 to a particular destination. For example, the ride application 102 sends a ride request to mobile devices of nearby drivers of vehicles and receives information from the mobile device of a driver that accepts the ride request, such as a license plate of the vehicle of the driver, a make and model of the vehicle, an age of the vehicle, a mileage of the vehicle, or so on. The mobile device 110 may store payment information for purchasing rides using the ride application 102.

In some embodiments, the ride application 102 corresponds to vehicles that do not have drivers other than the user, or may have no drivers at all, such as electric scooters, electric bicycles, or autonomous vehicles. In such cases, the ride application 102 is used to initiate operation of the electric scooter, electric bicycle, or autonomous vehicle, and acceptance of the ride request is automated. The vehicle may send information to the mobile device 110, similar to the mobile device of a driver.

The coordination module 104 coordinates the initiation and instantiation of automatic action-based product provisioning. The coordination module 104 connects to the ride application 102 such that it may request and/or receive information from the ride application 102. Connection between the coordination module 104 and the ride application 102 may be initiated by the user of the mobile device or may be automatic depending upon the embodiment. In an embodiment, connection between the coordination module 104 and the ride application 102 involves authentication of one or both with the other, e.g., by entering a password. Upon connecting to the ride application 102, the coordination module 104 is able to receive and/or request information from the ride application 102, e.g., via an application programming interface (API) of the rider application 102. In an embodiment, upon connecting, the coordination module 104 receives an authentication token from the ride application 102 and sends the authentication token to the management server 130. Upon receipt of the authentication token, the management server 130 may initiate a hook with the ride application 102 via the coordination module 104 such that ride protection triggers are automatically sent from the coordination module 104 to the management server 130.

The coordination module 104 receives user input to apply for a product. The product may be an insurance plan, such as ride insurance that lasts for the duration of a ride. The user input may include structured data to complete an enrollment application, such as a name, an address, contact information, and so on, which the coordination module 104 includes in an application for the product. Depending upon the embodiment, the coordination module 104 sends the application to enroll for the product to the management server 130 or the product provisioning server 120. In the former case, the management server 130 proceeds to send the application to the product provisioning server 120 and performs some or all of the actions described herein with reference to the coordination module 104. In an embodiment, the coordination module 104 may be used by a user to enroll in multiple products, e.g., for different vehicle types.

The coordination module 104 receives a generated product from the product provisioning server 120. For example, the coordination module 104 may receive an agreement for the user of the mobile device specifying details of the enrollment for ride insurance. The coordination module 104 displays the generated product and receives user input specifying whether to accept or deny the product. If the received user input specifies denying the product, the coordination module 104 sends a decline message to the product provisioning server 120. If the received user input specifies accepting the product, the coordination module 104 sends an acceptance message to the product provisioning server 120. Subsequently, the coordination module 104 may mediate the input of payment information from the user to initiate an authorized payment option for the user. For example, the coordination module 104 may prompt the user to enter credit card information to be stored by the coordination module 104 and/or management server 130 for use in paying for future ride insurance policies. In an embodiment, the coordination module 104 retrieves and uses payment information from the ride application 102.

Upon acceptance of the product, the coordination module 104 initiates one or more ride protection triggers associated with the product. Triggers are actions that indicate rides, which the coordination module 104 monitors via its connection with the ride application 102. For example, triggers may be the ride application 102 sending a ride request, receiving a ride confirmation from a driver, detecting that a location of the mobile device 110 is within a threshold distance of a pickup location (e.g., via geofencing), and detecting a monetary exchange involving the ride application 102, though alternative embodiments may include fewer, other, or additional triggers. The coordination module 104 sends the product and information about the one or more ride protection triggers to the management server 130 for storage and future use. Depending upon the embodiment, the coordination module 104 also sends information about the user and/or the mobile device to the management server 130. For example, the coordination module 104 or management server 130 may associate the product and/or corresponding ride protection trigger with an identifier and send a message to the management server 130 or coordination module 104, respectively, of the identifier and its associated product and/or ride protection trigger. In such an embodiment, the coordination module 104 alerts the management server 130 of a ride protection trigger activating by sending a notification to the management server 130 that a trigger was activated for the product associated with the identifier.

The coordination module 104 coordinates product claims, e.g., insurance claims. Upon receipt of user input specifying an insurance claim to be made, the coordination module 104 prompts the user to input structured data pertaining to the insurance claim, and may also collect data from the ride application 102 and/or mobile device 110, such as GPS locations and corresponding timestamps of the mobile device 110 and the driver's vehicle. The coordination module 104 sends the structured data and/or additional data to the management server 130 and/or product provisioning server 120. The coordination module 104 receives validation or rejection of the insurance claim, and displays the validation or rejection at a display of the mobile device.

In an embodiment, rather than apply for enrollment in a product, the coordination module 104 connects to an existing product, such as a primary auto insurance policy of the user of the mobile device, and reports the connection with the existing product to the management server 130. The coordination module 104 monitors a ride protection trigger to detect a ride share based on the ride application 102. Upon activation of the ride protection trigger, the coordination module 104 reports the ride share to the management server 130. The management server 130, in turn, reports the ride share to a provider of the existing product, e.g., the PPS 120. The management server 130 receives a dynamic product from the PPS 120 specifying a reduced rate for the existing product. For example, based on the ride share, the PPS 120 reduces a present cost of the user's primary auto insurance for the month and sends information pertaining to the reduced cost to the management server 130. Depending upon the embodiment, the management server 130 may send the dynamic product to the coordination module 104 for display.

The coordination module 104 can toggle products on and off based on user input to perform the one or the other. For example, a user may provide input to toggle off a product, then use the ride application 102 to request a ride, which the user subsequently takes. As the product is toggled off, the coordination module 104 does not track the ride protection triggers for the product and does not monitor those triggers or send corresponding data to the management server 130. The coordination module 104 may then receive user input to toggle on the product, and resumes monitoring the ride protection triggers.

When a product is toggled on, each time the user requests a ride using the ride application 102, the coordination module 104 alerts the management server 130, which subsequently acquires an instance of the product, e.g., ride insurance for the particular requested ride. The instance of ride insurance has a price, which may be dynamic based on data about the ride, as described above. Depending upon the embodiment, the coordination module 104 may display the dynamic price and only send a purchase order for the ride insurance to the management server 130 and/or PPS 120 upon receipt of user input specifying acceptance of the dynamic price, or otherwise reject the ride insurance. Alternatively, the coordination module 104 may automatically send the ride protection trigger to the management server 130, which purchases the product automatically, without involving the user.

The management server 130 is a server associated with the coordination module 104 that stores product information and manages the acquisition of instantiations of products based on ride protection triggers received from the coordination module 104. Depending upon the embodiment, some or all functionality described herein with reference to the management server 130 may instead by performed by the coordination module 104, or the management server 130 may perform some or all of the functionality described herein with reference to the coordination module 104.

The management server 130 receives ride protection triggers, or alerts regarding the ride protection triggers, as well as ride information, from the coordination module 104. The management server 130 determines a ride action based on the ride protection trigger and ride information. For example, the management server 130 may identify one product among a set of products with which the user is enrolled that matches the ride protection trigger and/or ride information. As a specific example, if the user is enrolled in ride insurance for automobiles and ride insurance for electric scooters, and a ride protection trigger is received by the management server 130 based on a driver of an automobile reaching a pickup point, the management server 130 determines the ride action to be an automobile ride and selects the ride insurance for automobiles.

The management server 130 interfaces with the PPS 120 to acquire instances of dynamic products based on the ride information. The management server 130 sends the ride information, as well as user-specific product information, to the PPS 120, and receives a dynamic product from the PPS 120. Depending upon the embodiment, the management server 130 either sends the dynamic product to the coordination module 104 for display to the user, and refrains from purchasing the dynamic product until user input specifying acceptance of the purchase is received from the coordination module 104, or the management server 130 automatically purchases the dynamic product, e.g., using stored credit card information of the user.

In an embodiment, the management server 130 receives ride protection triggers for multiple products regardless of whether the user of the mobile device has enrolled in all the multiple products. The management server 130 determines, based on a ride protection trigger, that the user is not enrolled with a corresponding product, and sends an alert to the coordination module 104 for display that indicates the user is not enrolled in the corresponding product. As a specific example, the user may be enrolled in a product for rides in automobiles, but not a product for electric scooters. The management server 130 may determine, based on a received ride protection trigger, that the user is preparing to or is riding an electric scooter, and responsively sends an alert to the coordination module 104 to indicate that the user is not enrolled in the product for electric scooters. The alert may include a prompt to enroll in the product for electric scooters. In an embodiment, the alert initiates a process for the coordination module 104 to automatically apply for the product, e.g., using stored application data. Upon enrollment, the management server 130 acquires a dynamic product for the ride.

The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Figure 2:
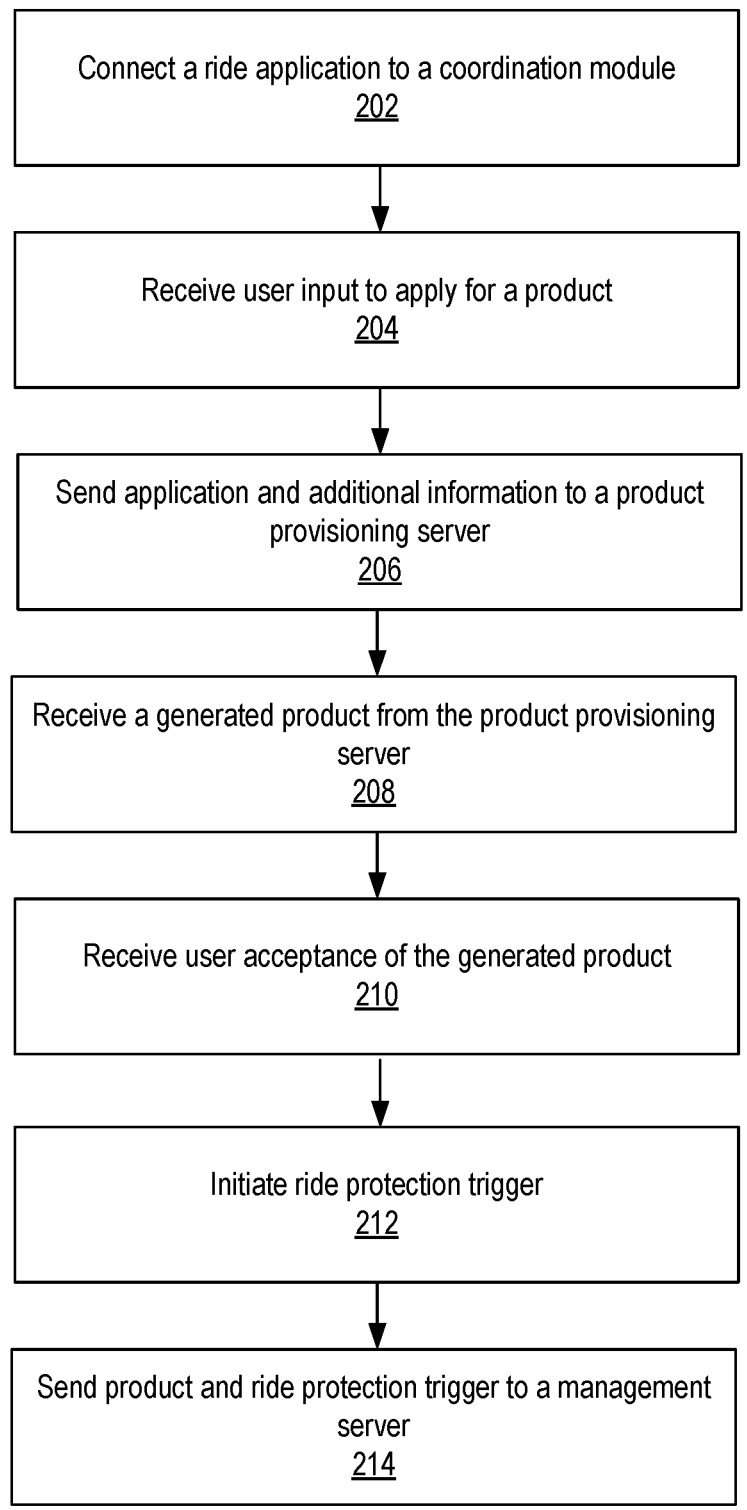
FIG. 2 illustrates a process for initiating automatic action-based product provisioning, according to one embodiment.

FIG. 2 illustrates a process for initiating automatic action-based product provisioning, according to one embodiment. The coordination module 104 on the mobile device 110 connects 202 to the ride application 102 on the mobile device 110. The coordination module 104 receives 204 user input to apply for a product, such as a ride insurance policy. The coordination module 104 sends 206 the application and additional information to the PPS 120. The coordination module 104 receives 208 a product tailored to the user from the PPS 120 based on the application and additional information. The coordination module 104 receives 210 user acceptance of the product and initiates 212 one or more ride protection triggers corresponding to the product. The coordination module 104 sends 214 the product and one or more triggers to the management server 130.

Figure 3:
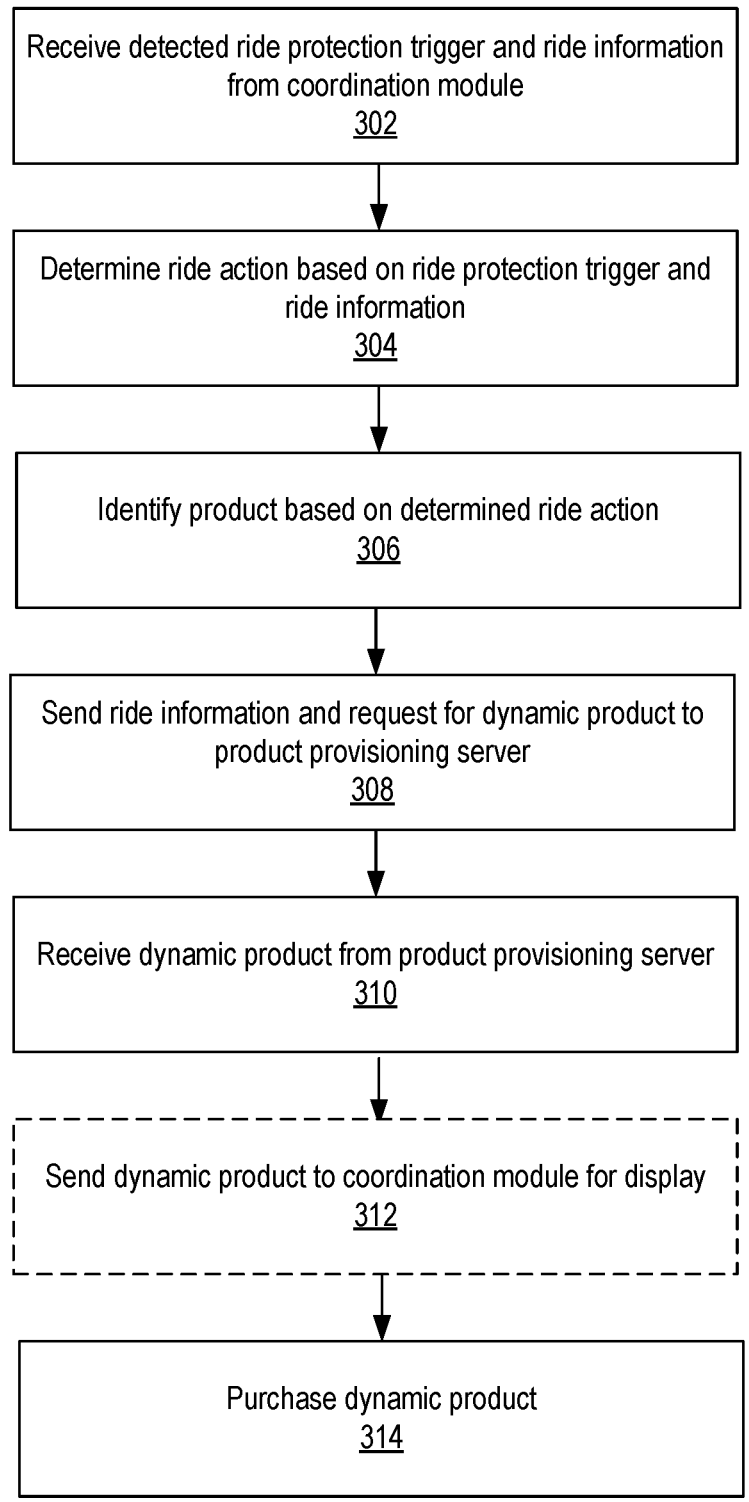
FIG. 3 illustrates a process for automatic action-based product provisioning, according to one embodiment.

FIG. 3 illustrates a process for automatic action-based product provisioning, according to one embodiment. The management server 130 receives 302 a detected ride protection trigger and corresponding ride information from the coordination module 104. The management server 130 determines 304 a ride action based on the ride protection trigger and ride information, such as a ride in an automobile. The management server 130 identifies 306 a product based on the determined ride action, e.g., a product with which the user is enrolled that corresponds to the ride action. The management server 130 sends 308 the ride information and a request for a dynamic product corresponding to the identified product to the PPS 120. The management server 130 receives 310 the dynamic product from the PPS 120. Depending upon the embodiment, the management server 130 may send 312 the dynamic product to the coordination module for display. The management server 130 purchases 314 the dynamic product.

Figure 4:
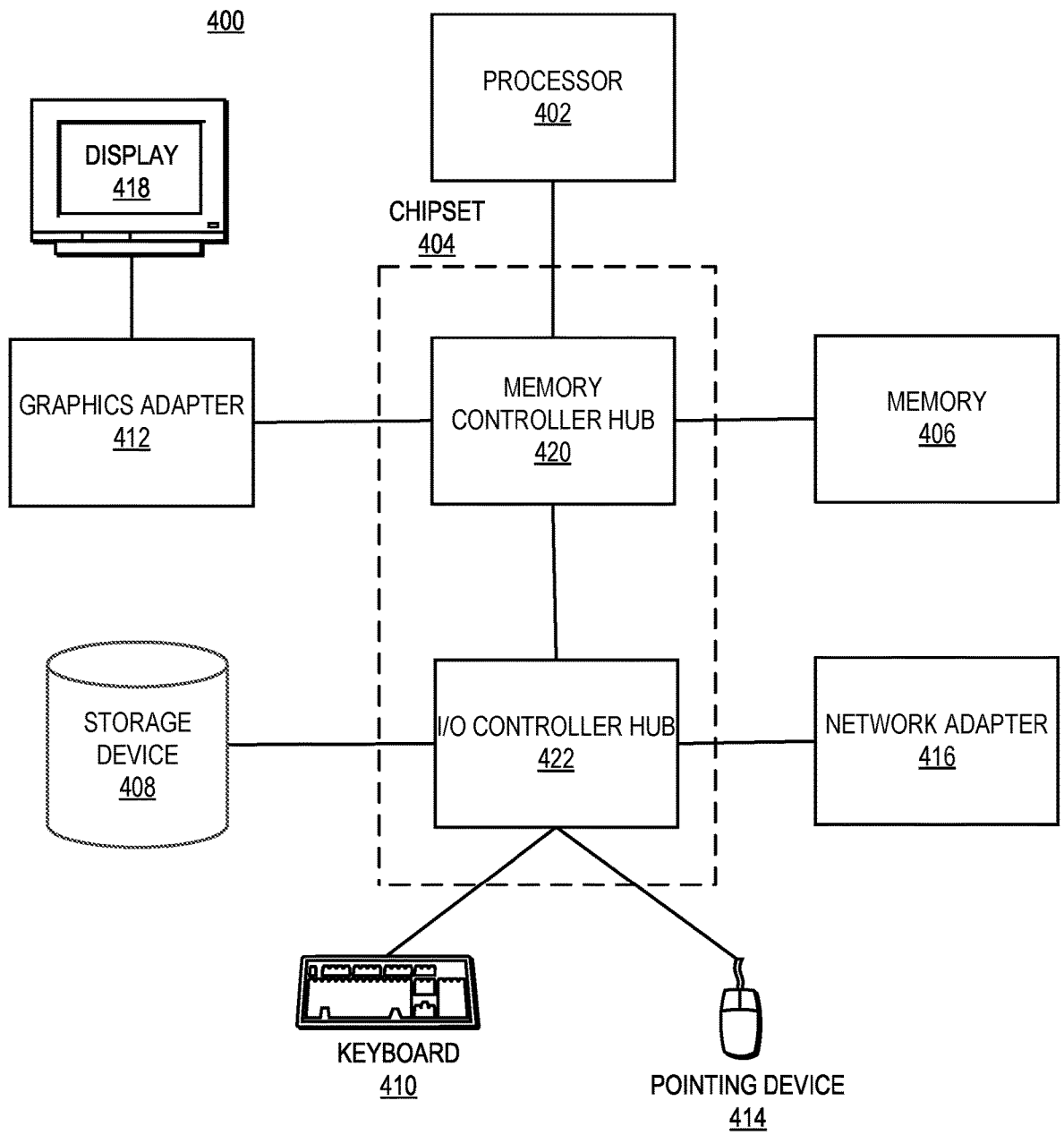
FIG. 4 is a block diagram illustrating a computer system, according to one embodiment.

The entities shown in FIG. 1 are implemented using one or more computers. FIG. 4 is a block diagram that illustrates a computer 400, according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422.

In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to the network 140.

As is known in the art, a computer 400 can have different and/or other components than those shown in FIG. 4. In addition, the computer 400 can lack certain illustrated components. For example, the computer acting as the management server 140 can be formed of multiple blade servers linked together into one or more distributed systems and lack components such as keyboards and displays. Moreover, the storage device 408 can be local and/or remote from the computer 400 (such as embodied within a storage area network (SAN)).

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 1. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 202, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for indexing data entries that may be executed through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for product provisioning, comprising:
   hooking, by a computing device, to a ride application upon a mobile device to monitor for a ride protection trigger, the ride protection trigger comprising an action that indicates initiation of a ride coordinated by the ride application;
   detecting, by the computing device, activation of the ride protection trigger for the ride, the detecting activation of the ride protection trigger comprising receiving corresponding ride information;
   identifying, by the computing device, a product based on the detected ride protection trigger and corresponding ride information;
   sending, by the computing device, to a product provisioning server, a request for a dynamic product that corresponds to the identified product; and
   automatically acquiring, by the computing device, the dynamic product based on a cost.

2. The computer-implemented method of claim 1, wherein detecting activation of the ride protection trigger further comprises:
   determining, based on the ride information, a pickup location for the ride;
   obtaining a location estimate of the mobile device; and
   determining, based on the location estimate, whether the mobile device is within a threshold distance from the pickup location;
   wherein the ride protection trigger is activated responsive to determining the mobile device is within the threshold distance from the pickup location.

3. The computer-implemented method of claim 1, wherein the product is a ride insurance policy that insures a user of the mobile device for a duration of the ride.

4. The computer-implemented method of claim 1, further comprising:
   determining, based on the detected ride protection trigger and corresponding ride information, a particular ride action from a set of ride actions; and
   identifying a relevant product from a set of products corresponding to a user of the mobile device based on the particular ride action, wherein the relevant product corresponds to a type of vehicle of a vehicle identified in the ride information;
   wherein the request for the dynamic product is specified for the relevant product.

5. The computer-implemented method of claim 1, wherein the ride information comprises one or more of an identified vehicle, an expected duration of the ride, a make and model of the vehicle, a mileage of the vehicle, a location of the vehicle, an expected path of the ride, a pickup location for the ride, an expected average speed for the ride, personal information of a driver, a driver history of a driver, personal information of a user, rider history of a user, stored information about past drives and past rides of other drivers and riders, and past ride insurance prices of other riders.

6. The computer-implemented method of claim 1, wherein the product is ride insurance, further comprising:
   receiving, from the mobile device, an insurance claim corresponding to the ride insurance, wherein the insurance claim comprises at least one of time-stamped global positioning system (GPS) data of the mobile device and time-stamped GPS data of a vehicle;
   sending the insurance claim to the product provisioning server, wherein the product provisioning server validates the insurance claim based on the time-stamped GPS data; and
   receiving, from the product provisioning server, an insurance payout based on the insurance claim.

7. The computer-implemented method of claim 1, further comprising:
   receiving, from a mobile device, a second ride protection trigger for a second ride and corresponding second ride information;
   identifying a second product based on the second ride protection trigger and second ride information;
   determining that a user of the mobile device is not associated with the second product; and
   sending for display, to the mobile device, a notification that the user does not have the second product.

8. A non-transitory computer-readable storage medium storing computer program instructions executable by a processor to perform operations, the operations comprising:
   hooking, by a computing device, to a ride application upon a mobile device to monitor for a ride protection trigger, the ride protection trigger comprising an action that indicates initiation of a ride coordinated by the ride application;
   detecting, by the computing device, activation of the ride protection trigger for the ride, the detecting activation of the ride protection trigger comprising receiving corresponding ride information;
   identifying, by the computing device, a product based on the detected ride protection trigger and corresponding ride information;
   sending, by the computing device, to a product provisioning server, a request for a dynamic product that corresponds to the identified product; and
   automatically acquiring, by the computing device, the dynamic product based on a cost.

9. The non-transitory computer-readable storage medium of claim 8, the operations further comprising:
   determining, based on the ride information, a pickup location for the ride;
   obtaining a location estimate of the mobile device; and
   determining, based on the location estimate, whether the mobile device is within a threshold distance from the pickup location;
   wherein the ride protection trigger is activated responsive to determining the mobile device is within the threshold distance from the pickup location.

10. The non-transitory computer-readable storage medium of claim 8, wherein the product is a ride insurance policy that insures a user of the mobile device for a duration of the ride.

11. The non-transitory computer-readable storage medium of claim 8, the operations further comprising:
   determining, based on the detected ride protection trigger and corresponding ride information, a particular ride action from a set of ride actions; and
   identifying a relevant product from a set of products corresponding to a user of the mobile device based on the particular ride action, wherein the relevant product corresponds to a type of vehicle of a vehicle identified in the ride information;
   wherein the request for the dynamic product is specified for the relevant product.

12. The non-transitory computer-readable storage medium of claim 8, wherein the identified product is an existing product, and the dynamic product is a reduced cost for the existing product.

13. The non-transitory computer-readable storage medium of claim 8, wherein the product is ride insurance, the operations further comprising:
   receiving, from the mobile device, an insurance claim corresponding to the ride insurance, wherein the insurance claim comprises at least one of time-stamped global positioning system (GPS) data of the mobile device and time-stamped GPS data of a vehicle;
   sending the insurance claim to the product provisioning server, wherein the product provisioning server validates the insurance claim based on the time-stamped GPS data; and
   receiving, from the product provisioning server, an insurance payout based on the insurance claim.

14. The non-transitory computer-readable storage medium of claim 8, the operations further comprising:
   receiving, from a mobile device, a second ride protection trigger for a second ride and corresponding second ride information;
   identifying a second product based on the second ride protection trigger and second ride information;

determining that a user of the mobile device is not associated with the second product; and sending for display, to the mobile device, a notification that the user does not have the second product.

15. A system, comprising:

a processor; and a non-transitory computer-readable storage medium storing computer program instructions executable by the processor to perform operations, the operations comprising:

hooking, by a computing device, to a ride application upon a mobile device to monitor for a ride protection trigger, the ride protection trigger comprising an action that indicates initiation of a ride coordinated by the ride application;

detecting, by the computing device, activation of the ride protection trigger for the ride, the detecting activation of the ride protection trigger comprising receiving corresponding ride information;

identifying, by the computing device, a product based on the detected ride protection trigger and corresponding ride information;

sending, by the computing device, to a product provisioning server, a request for a dynamic product that corresponds to the identified product; and automatically acquiring, by the computing device, the dynamic product based on a cost.

16. The system of claim 15, further comprising:

determining, based on the ride information, a pickup location for the ride;

obtaining a location estimate of the mobile device; and determining, based on the location estimate, whether the mobile device is within a threshold distance from the pickup location;

wherein the ride protection trigger is activated responsive to determining the mobile device is within the threshold distance from the pickup location.

17. The system of claim 15, wherein the product is a ride insurance policy that insures a user of the mobile device for a duration of the ride.

18. The system of claim 15, further comprising:

determining, based on the detected ride protection trigger and corresponding ride information, a particular ride action from a set of ride actions; and identifying a relevant product from a set of products corresponding to a user of the mobile device based on the particular ride action, wherein the relevant product corresponds to a type of vehicle of the vehicle included in the ride information;

wherein the request for the dynamic product is specified for the relevant product.

19. The system of claim 15, wherein the product is ride insurance, further comprising:

receiving, from the mobile device, an insurance claim corresponding to the ride insurance, wherein the insurance claim comprises at least one of time-stamped global positioning system (GPS) data of the mobile device and time-stamped GPS data of a vehicle;

sending the insurance claim to the product provisioning server, wherein the product provisioning server validates the insurance claim based on the time-stamped GPS data; and receiving, from the product provisioning server, an insurance payout based on the insurance claim.

20. The system of claim 15, further comprising:

receiving, from a mobile device, a second ride protection trigger for a second ride and corresponding second ride information;

identifying a second product based on the second ride protection trigger and second ride information;

determining that a user of the mobile device is not associated with the second product; and sending for display, to the mobile device, a notification that the user does not have the second product.

* * * * *